United States Patent
Winkler

[19]

[11] Patent Number: 6,146,096

[45] Date of Patent: Nov. 14, 2000

[54] BULB TURBINE SYSTEM

[75] Inventor: Stefan Winkler, Linz, Austria

[73] Assignee: VA Tech Voest MCE GmbH & Co, Linz, Austria

[21] Appl. No.: 09/263,818

[22] Filed: Mar. 8, 1999

Related U.S. Application Data

[63] Continuation of application No. PCT/AT97/00193, Sep. 9, 1997.

[30] Foreign Application Priority Data

Sep. 10, 1996 [AT] Austria ..................................... 1601/96

[51] Int. Cl.[7] ...................................................... F01D 1/00
[52] U.S. Cl. ............................... 415/220; 290/54; 405/78; 415/3.1
[58] Field of Search ............................... 415/3.1, 4.3, 196, 415/219.1, 220, 222; 416/244 R; 290/43, 52, 54; 405/75, 78

[56] References Cited

U.S. PATENT DOCUMENTS

| | | | |
|---|---|---|---|
| 856,115 | 6/1907 | Wadagaki | 415/207 |
| 2,634,375 | 4/1953 | Guimbal | 290/52 |
| 3,168,235 | 2/1965 | Valdi | 415/220 |
| 3,173,604 | 3/1965 | Sheets et al. | 415/218.1 |
| 3,535,540 | 10/1970 | Boulogne | 290/52 |
| 4,102,599 | 7/1978 | Ziegler | 415/219 R |
| 4,207,015 | 6/1980 | Atencio | 405/78 |
| 4,395,198 | 7/1983 | Schucker | 415/219 R |
| 4,468,153 | 8/1984 | Gutierrez Atencio | 405/78 |
| 4,488,965 | 12/1984 | Müller et al. | |
| 4,697,984 | 10/1987 | Takeuchi et al. | 415/219 R X |
| 4,755,690 | 7/1988 | Obermeyer | 290/52 |
| 4,804,855 | 2/1989 | Obermeyer | 290/54 |
| 4,940,387 | 7/1990 | Horne et al. | 415/221 |
| 5,222,863 | 6/1993 | Jones | 415/222 X |
| 5,825,094 | 10/1998 | Hess | 290/54 |

FOREIGN PATENT DOCUMENTS

| | | |
|---|---|---|
| 326582 | 2/1975 | Austria . |
| 3/45757 | 3/1977 | Austria . |
| 2412722 | 7/1979 | France . |
| 2516834 | 5/1983 | France . |
| 884930 | 7/1949 | Germany . |
| 1503274 | 10/1970 | Germany . |
| 649348 | 5/1985 | Switzerland . |
| 672001 | 5/1952 | United Kingdom . |
| 2218742 | 11/1989 | United Kingdom . |
| WO89/00646 | 1/1989 | WIPO . |

*Primary Examiner*—John E. Ryznic
*Attorney, Agent, or Firm*—Jacobson, Price, Holman & Stern, PLLC

[57] ABSTRACT

The invention concerns a system (1) of bulb turbines (2), in which each bulb turbine (2) comprises a generator located in an essentially cylindrical area (4) of a turbine housing and a turbine wheel coupled to the generator and mounted in such a way that it can rotate (7), a suction pipe (13) being attached to each bulb turbine. Several bulb turbines (2) are coupled with one another in a field-like or matrix-like order both in an essentially horizontal position side by side as well as stacked in a vertical position or are stored in at least one single common support (8). In said system, several bulb turbines are stored in one common support (8) and releasably connected to the corresponding suction pipes (13).

9 Claims, 4 Drawing Sheets

BULB TURBINE SYSTEM

This is a Continuation Application based on PCT/AT97/00193, filed on Sep. 9, 1997.

BACKGROUND OF THE INVENTION

The present invention relates to a system of bulb turbines, wherein the bulb turbines are each comprised of a generator arranged within a substantially cylindrically designed region of a turbine casing and a rotatably mounted turbine runner coupled with the generator, which are each joined by a draft tube, wherein a plurality of bulb turbines are mututally coupled in a field-like or matrix-like array both in a substantially horizontal arrangement one beside the other and in a vertical arrangement one above the other or mounted in at least one common support, respectively, said plurality of bulb turbines each mounted in a common support being detachably coupled with associated draft tubes.

Bulb turbines of the initially defined kind, which are each substantially comprised of a generator arranged within a substantially cylindrically designed region of a turbine casing and a rotatably mounted turbine runner coupled with the generator, have been known in various configurations, reference in this context being made, for instance, to DE-B 1 503 274, AT-B 326 582, AT-B 345 757 or CH-A 649 348. In those known stationary bulb turbine configurations, such a bulb turbine is mounted in a specially prepared foundation, or in an appropriately equipped second casing surrounding the turbine casing, via usually sturdy anchoring means, wherein additional stabilizing means are required beside accordingly stable supporting means in order to enable the safe mounting of the usually large-dimensioned bulb turbine. Furthermore, it is to be anticipated that in such stationarily installed plants specifically designed structures directly adapted to the respective circumstances are employed and that the replacement of such plants or their use on any other site is not feasible in most cases.

In connection with bulb turbines it is, furthermore, known to provide small-structure and optionally transportable units as may, for instance, be used in tidal power stations. In this context, it is referred to U.S. Pat. No. 4,207,015 and U.S. Pat. No. 4,468,153 among others, wherein such plants comprise additional installations, for instance in the form of special ballast elements, in order to enable an adaptation to different flow conditions, in particular, if used in tidal power stations. Thus, also plants of this type are limited to specific purposes of use and cannot be readily applied to different fields and applications.

From WO 89/00646 a system of bulb turbines of the initially defined kind has, furthermore, become known, in which on an arrangement at a water front a regular array of interconnected parallelly arranged draft tubes is located, on which a plurality of immersible hydraulic engines, in particular turbine generators, each comprising a runner rotatably arranged thereon are provided. A similar configuration of a system of several mutually coupled bulb turbines, may moreover, be taken from U.S. Pat. No. 4,468,153 already mentioned above.

Moreover, U.S. Pat. No. 4,755,690 discloses a system of bulb turbines of the initially defined kind, wherein a plurality of bulb turbines mounted in a common support are coupled with respective draft tubes outside the location of use, whereupon the thus assembled sets are lowered and used for gaining energy.

Furthermore, it is to be anticipated that any adaptation of the output of a bulb turbine to different circumstances and, in particular, an increase in output not only will require a considerable increase in height and width, which basically means a considerable increase in the diameter of the bulb turbine, but will also involve an accordingly excessive increase in length and an increase in the weight of the system.

SUMMARY OF THE INVENTION

The present invention, therefore, has as its object to provide a system of bulb turbines by which it is feasible to obtain an appropriate adaptation to the desired output and the prevailing flow conditions while utilizing the available flow cross section as completely as possible, without having to enlarge the dimensions of individual bulb turbines and, in particular, without having to enlarge the longitudinal extension. Furthermore, it is aimed to provide a system capable of being used without complex construction and foundation works and to optionally retrofit existing plants in which water currents occur in order to gain useful energy contained in such optionally discontinuous currents, with emphasis being laid on improved and simplified maintenance feasibilities as well as the universal applicability of the system.

To solve these objects, the bulb turbine system according to the invention, departing from a system of the initially mentioned type, essentially is characterized in that for the detachable coupling of the bulb turbines with associated draft tubes in the operating position coupling of a support comprising bulb turbines mounted therein with draft tubes optionally all mounted in one retention means is effected by complementary semi-shell-shaped connection pieces. By the fact that, according to the invention, a plurality of bulb turbines each mounted in a common support are detachably coupled with respective draft tubes, it is feasible in a simple manner using small-structured bulb turbines, i.e., in particular, relatively small-length and relatively low-weight bulb turbines, to obtain a precise adaptation to the spacial conditions available in each case and the water passageway cross sections. The detachable coupling of the turbines with the respective draft tubes renders feasible the optimization of the system of bulb turbines with regard to maintenance and repair measures, both in terms of space demand and in terms of the machine part weights to be moved or displaced. By the bulb turbines being designed to be separable from the respective draft tubes, it is feasible in case of need to lift, or remove from the operating position, for maintenance or repair measures only that part of the system of bulb turbines which actually requires servicing, i.e., either the draft tubes or the turbines. Due to that separation of the turbines from the draft tubes, it is also feasible to minimize the space demand required for repair and maintenance works above such a system of bulb turbines.

Since, by providing an appropriate plurality of bulb turbines, an accordingly large cross section can both be covered and utilized, it is of decisive importance with a view to reducing the overall weight to be moved during transportation or installation that the bulb turbines mounted in a common support are designed to be detachable from the respective draft tubes. For instance, when using such a plurality of bulb turbines mounted in a common support and separable from the draft tubes, suitable maintenance or replacement operations may consequently be realized in a simple manner by lifting off the system, or removing from the system, only certain draft tubes or turbines, for instance all of the draft tubes or turbines vertically superimposed in a row, in order to replace a single element or carry out maintenance work, respectively.

In order to enable a particularly simple separation of the turbines from the associated draft tubes, the bulb turbine system according to the invention it is proposed that coupling of a support comprising bulb turbines mounted therein with draft tubes optionally all mounted in one retention means is effected by complementary semi-shell-shaped connection pieces. By coupling via complementary semi-shell-shaped connection pieces a support comprising bulb turbines mounted therein with draft tubes all mounted in one retention means, a composite construction of the draft tubes and turbines may be provided by simply superimposing and optionally interlocking the two complementary semi-shells, thereby enabling the separation into individual elements in a simple and reproducible manner merely by lifting an element or a support.

In a preferred manner, the bulb turbine system according to the invention has been further developed to the extent that a support comprising a plurality of bulb turbines is movable relative to the draft tubes on a, particularly stepped or obliquely extending, guide track. Due to the fact that, according to the invention, a support comprising a plurality of bulb turbines is movable relative to the draft tubes in a guide track which, in particular, is stepped or obliquely extending, a plurality of bulb turbines may readily be lifted off the respective draft tubes and raised or displaced along the guide track to above the level of the water surface for maintenance or repair purposes as well as lowered into the respective operating position after completion of maintenance and repair works without cumbersome adjusting and connecting operations of the individual machine parts. The provision of stepped or obliquely extending guide tracks for lifting a support comprising a plurality of bulb turbines, thus, enables the turbines to be positioned at any time without cumbersome welding and cutting operations simply by lifting the turbines from, and lowering them into, the operating position and mounting them correctly in the same.

In order to ensure a particularly simple coupling and the mutual support of the individual bulb turbines, it is preferably contemplated that each bulb turbine is surrounded by, and connected or connectable with, frame elements each defining, at least in the state of the system coupled with neighboring bulb turbines, a frame having a, for instance, substantially square cross section and that the frames or frame elements of neighboring bulb turbines are connected, in particular screwed, with one another. Such frame elements in a simple manner can be tuned to the dimensions and configurations of the bulb turbines used, wherein with an appropriate coupling of neighboring turbines not every turbine necessarily need be surrounded by a complete frame, but individual frame elements of neighboring turbines may be assembled or interconnected in a manner so as to constitute a suitable frame structure in the assembled state of the overall system of bulb turbines. The provision of, in particular, substantially square cross sections for the frames in the assembled state offers an optimum way of combining a desired number of bulb turbines, it being additionally feasible to do with an extremely small number of different and mutually tuned frame elements.

In order to provide a particularly simple and reliable support of the individual bulb turbines on one another and on individual frame elements, or a support formed by the frame elements for the system according to the invention, it is, moreover, proposed in a preferred manner that, in a manner known per se, the bulb turbines in the region of the turbine runner and/or in their substantially cylindrical region of the turbine casing are supported on the pertaining frames or frame elements or directly upon one another. Such a support in the region of the turbine runner and/or in the substantially cylindrical partial region of the turbine casing allows for an accordingly stable mounting of the individual turbines while additionally keeping free appropriate passageway cross sections for the water. In this connection, it is proposed in a particularly preferred manner aimed at a particularly stable and, at the same time, cost-effective and simple mounting of the individual bulb turbines that the support of the turbine casing on the respective frames or frame elements is effected via props or struts each bearing against the corner points of the frames or frame elements having substantially square cross sections.

Instead of providing a plurality of frame elements which are each respectively coupled with the individual bulb turbines for mounting and supporting the same, a modified and further preferred embodiment of the bulb turbine system according to the invention provides that a common support for the plurality of bulb turbines is formed of a grid-like or scaffold-like structure comprising partial regions each having a substantially square cross section, for mounting one bulb turbine each. Such a common support may, thus, be produced or prefabricated in a simple manner using the respective sectional or structural elements so as to enable the reception and mounting of the individual bulb turbines later on. Also in that case, a desired plurality of bulb turbines depending on the respective requirements may be coupled in a common system by means of simple structural elements and readily installed, and detachably coupled with the respective draft tubes, on the desired location of use.

In order to provide for a particularly simple and cost-effective anchorage of the system according to the invention without involving cumbersome preparation and, in particular, foundation work prior to the installation of the system according to the invention, it is, moreover, proposed in a preferred manner that the support carrying a plurality of bulb turbines is capable of being detachably fastened or anchored to the subsoil via fastening or anchoring means. Such fastening or anchoring means may be formed by readily settable anchor rods or the like, which are accordingly easy to adapt to the conditions of the environment.

As already mentioned several times, the system according to the invention may be adapated to the respective requirements by appropriately coupling a desired number of turbines, it being proposed according to the invention to use the system of bulb turbines, for instance, in a channel system, a sluice system, a sprinkler or an irrigation plant or the like. Such channel systems, sluice systems or also sprinkler or irrigation plants are known to have dimensions and configurations considerably differing from one another such that the system according to the invention, which offers an extremely easy adaptability to surrounding conditions, is particularly advantageous to use. In addition, the coupling of relatively small units requiring an altogether low structural expenditure for the overall plant also renders feasible an economic use in optionally discontinuous operation as may readily occur in one of the above-mentioned systems or plants.

When using the bulb turbine system according to the invention particularly in a sluice system, it is immediately apparent that, when operating the sluice system at a flow-through in opposite directions, the utilization of the flow for the production of energy by aid of the bulb turbine system according to the invention is extremely desirable in both flow directions. It is, therefore, contemplated according to a particularly preferred embodiment of the bulb turbine system according to the invention that the inflow of water into the bulb turbines is feasible both in a direction directly onto the turbine runner via the draft tube and in a direction via the turbine casing and subsequently onto the turbine runner. By the invention offering the opportunity to design bulb turbines such that the inflow of water into the turbines may occur both in a direction directly onto the turbine runner and in a direction via the turbine casing and then onto the turbine runner, appropriate utilization of the flow energy and its conversion into electric energy is, thus, rendered feasible irrespective of the direction of flow. In this respect, it is additionally proposed, in particular in the region of the substantially conical partial region of the bulb turbine following upon the substantially cylindrical turbine casing and whose end is followed by the turbine runner, to provide no distributor and, in particular, no vanes in order to enable the inflow into the turbine runner both directly and also subsequent to the turbine casing. It is true that, by omitting vanes or a distributor, the efficacy of the individual bulb turbines will possibly be slightly reduced by an inflow first via the turbine casing and then via the turbine runner, yet such an optionally reduced efficiency will be largely compensated for in any event by an inflow feasible also in a direction opposite thereto.

BRIEF DESCRIPTION OF THE DRAWINGS

In the following, the invention will be explained in more detail by way of exemplary embodiments of a bulb turbine system according to the invention schematically illustrated in the accompanying drawing. Therein.

DETAILED DESCRIPTION OF PREFERRED EMBODIMENTS OF THE INVENTION

Figure 1:
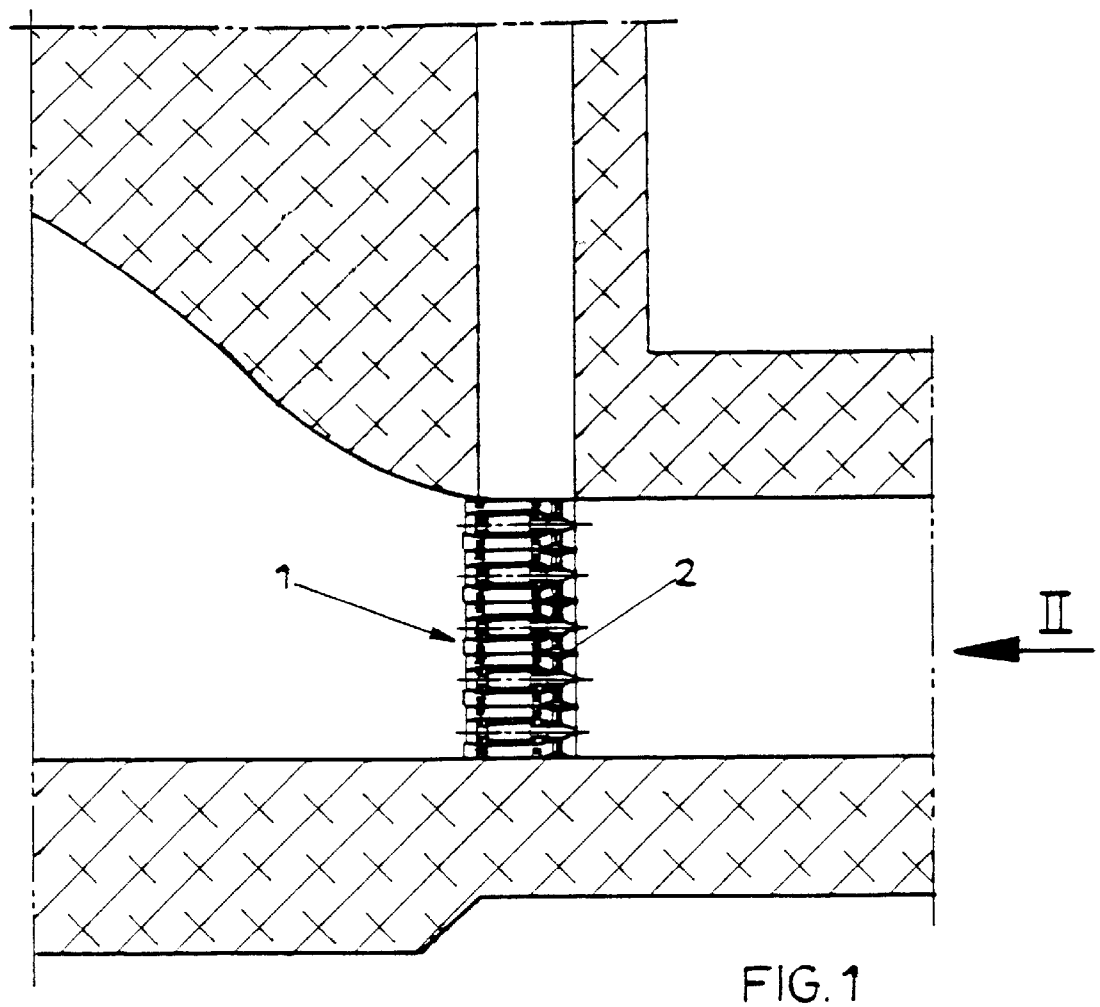
FIG. 1 is a schematic side view of an array of a bulb turbine system according to the invention, for instance in the region of a sluice system.
Figure 2:
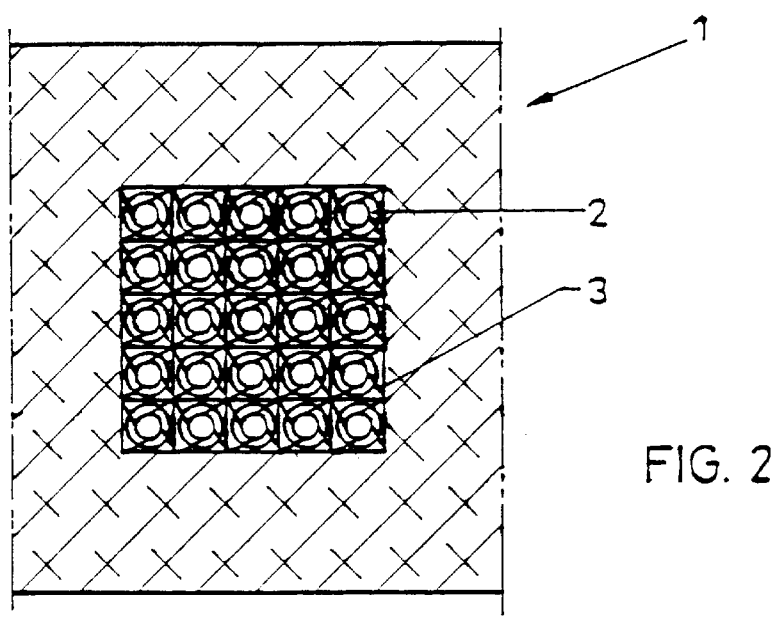
FIG. 2 is a view onto the configuration according to FIG. 1 in the direction of arrow II.
Figure 3:
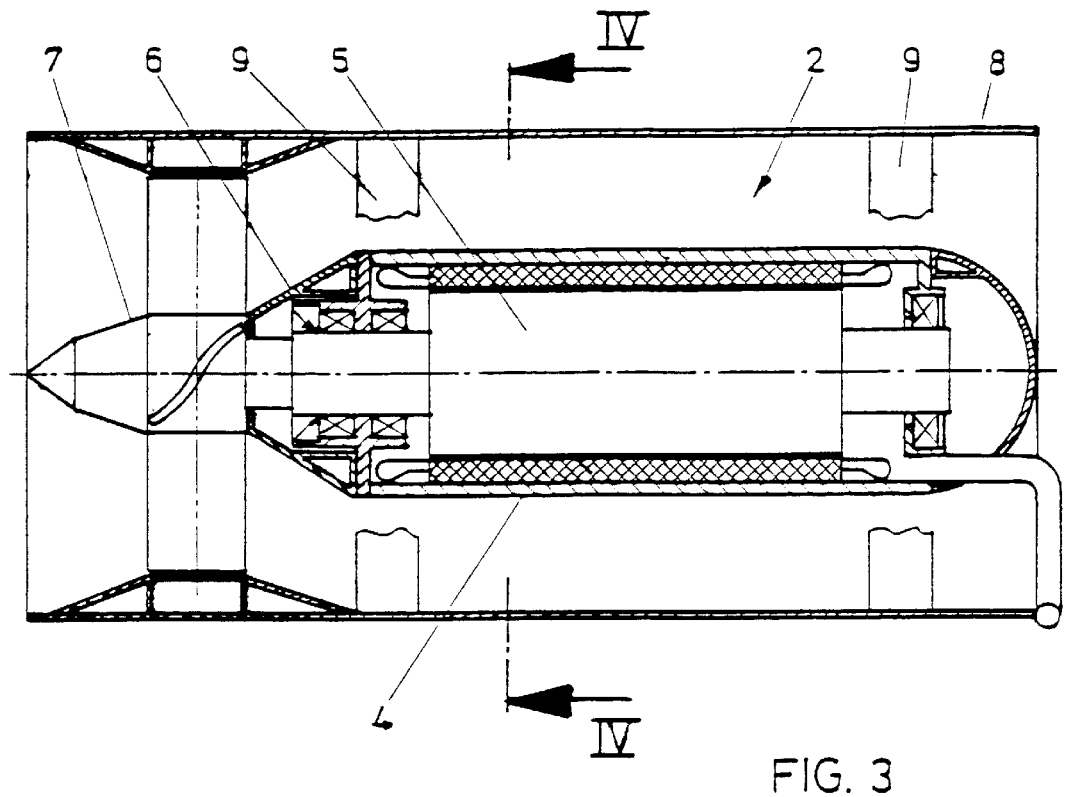
FIG. 3 is a section through a bulb turbine of the system according to the invention according to FIGS. 1 and 2 on an enlarged scale.
Figure 4:
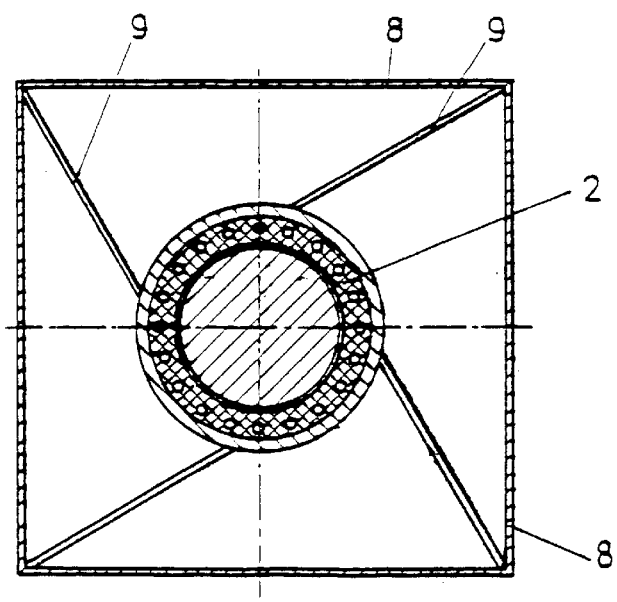
FIG. 4 is a section along line IV—IV of FIG. 3.

FIGS. 1 and 2 schematically depict the arrangement of a system of bulb turbines 2 generally denoted by 1, a variant of an individual bulb turbine being illustrated in more detail in FIGS. 3 and 4. As is immediately apparent from FIGS. 1 and 2, a plurality of individual bulb turbines 2 is mutually coupled both in the horizontal direction one beside the other and in the vertical direction one above the other in a manner adapted to the local conditions and arranged in a grid-like or frame-like structure 3, simple adaptation to the local conditions being feasible by appropriately choosing the number of both adjacently and superimposedly arranged bulb turbines 2. In addition, the assembled system made up of small individual units 2 also may be transported in an accordingly easy manner and readily incorporated in existing plants, optionally even retroactively, without requiring cumbersome preparation and foundation operations, wherein draft tubes not illustrated in detail in FIGS. 1 and 2 may be coupled to the individual bulb turbines 2.

In the illustration according to FIGS. 3 and 4, a single bulb turbine 2 is illustrated in more detail, it being apparent that a generator schematically indicated by 5 is rotatably mounted in a substantially cylindrical partial section 4 of the turbine casing, wherein a turbine runner schematically indicated by 7 is mounted on the end of a conical section 6 following upon the cylindrical partial region 4. In the embodiment represented in FIGS. 3 and 4, the turbine casing at least in its cylindrical region is surrounded by frame elements 8 defining a frame having a substantially square cross section. Appropriate props or struts 9 are provided, in particular in the front and rear sections of the cylindrical partial region 4 of the turbine casing, for supporting and mounting the bulb turbine 2 on the frame elements 8, said props or struts substantially bearing against the corner points of the frame constituted by the frame elements 8 as is clearly apparent, in particular, from FIG. 4.

Figure 5:
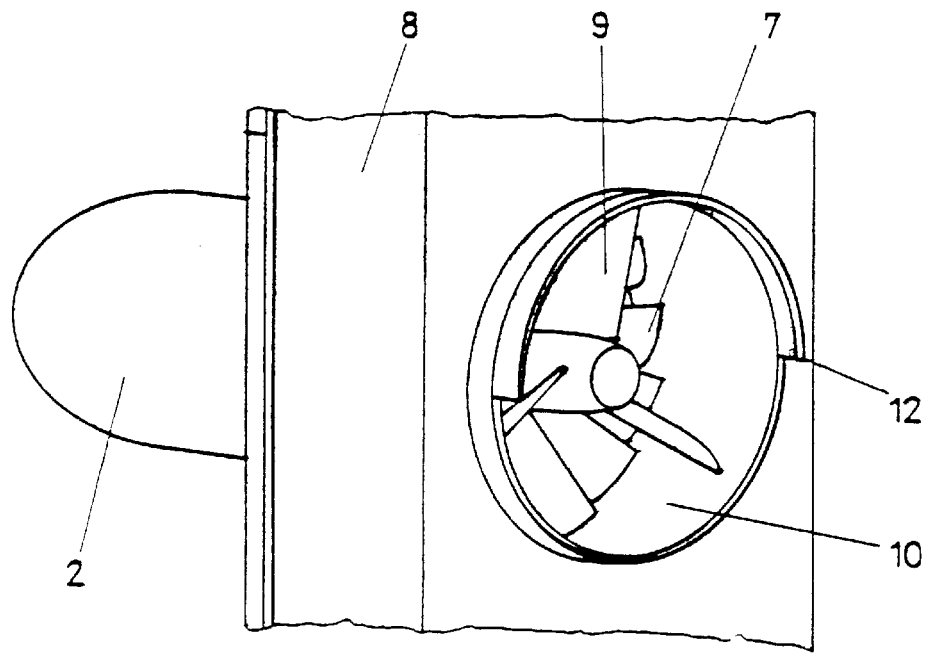
FIG. 5 is a partial view of a frame or support with a bulb turbine of a modified configuration of the invention carried by, or mounted on, the same.
Figure 6:
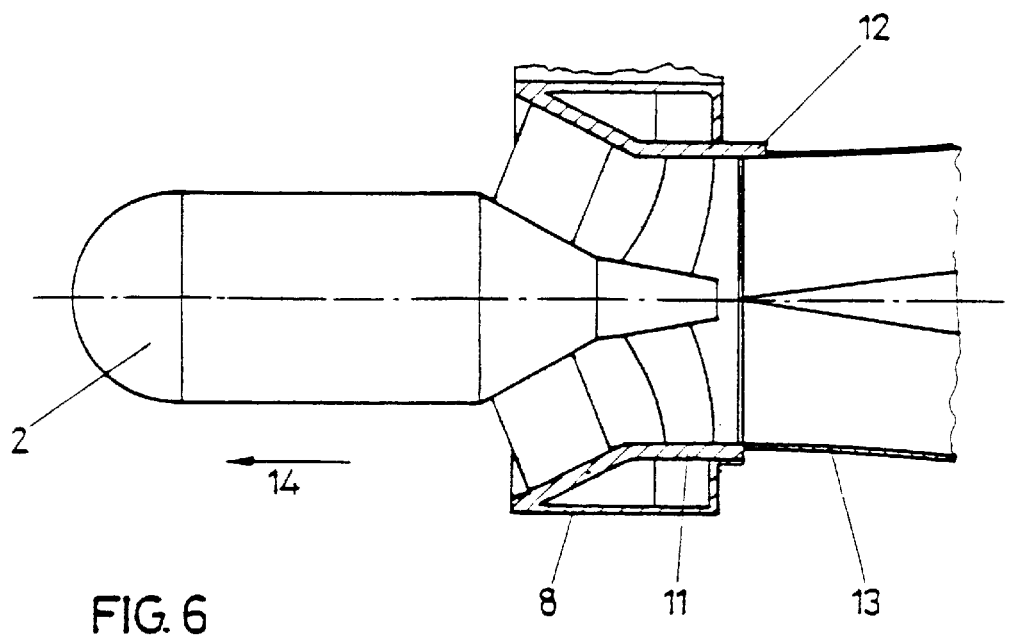
FIG. 6 is a section through a bulb turbine mounted in a frame or support according to FIG. 5 with a schematically represented draft tube following thereupon.

FIG. 5 is a partial view of a modified embodiment of a frame or support 8 in which a bulb turbine 2 is inserted. The variant of the frame 8 according to FIG. 5 comprises a frame element arranged merely in the region of the turbine runner or conical section 6 of the turbine 2, respectively. The substantially cylindrical partial section 4 of the turbine 2 projects from the frame 8 without any further support. Struts or props 9 on which the turbine is supported on the frame element 8 are provided in the front section and, in particular, in the region of the turbine runner 7 or of the conical partial region 6 of the turbine, respectively, for supporting and mounting the bulb turbine 2 within the frame or support 8. On its end facing the turbine runner, and the draft tube not illustrated, the frame element has a circular opening 10 in which the bulb turbine 2 is inserted. The supporting element 11 inserted in the frame 8 and carrying the bulb turbine 2 as well as insertion parts, which is illustrated in more detail, in particular, in FIG. 6, on a partial region of its periphery comprises a projecting semi-shell-shaped connection piece 12 for coupling with a draft tube 13 schematically illustrated in FIG. 6.

Figure 7:
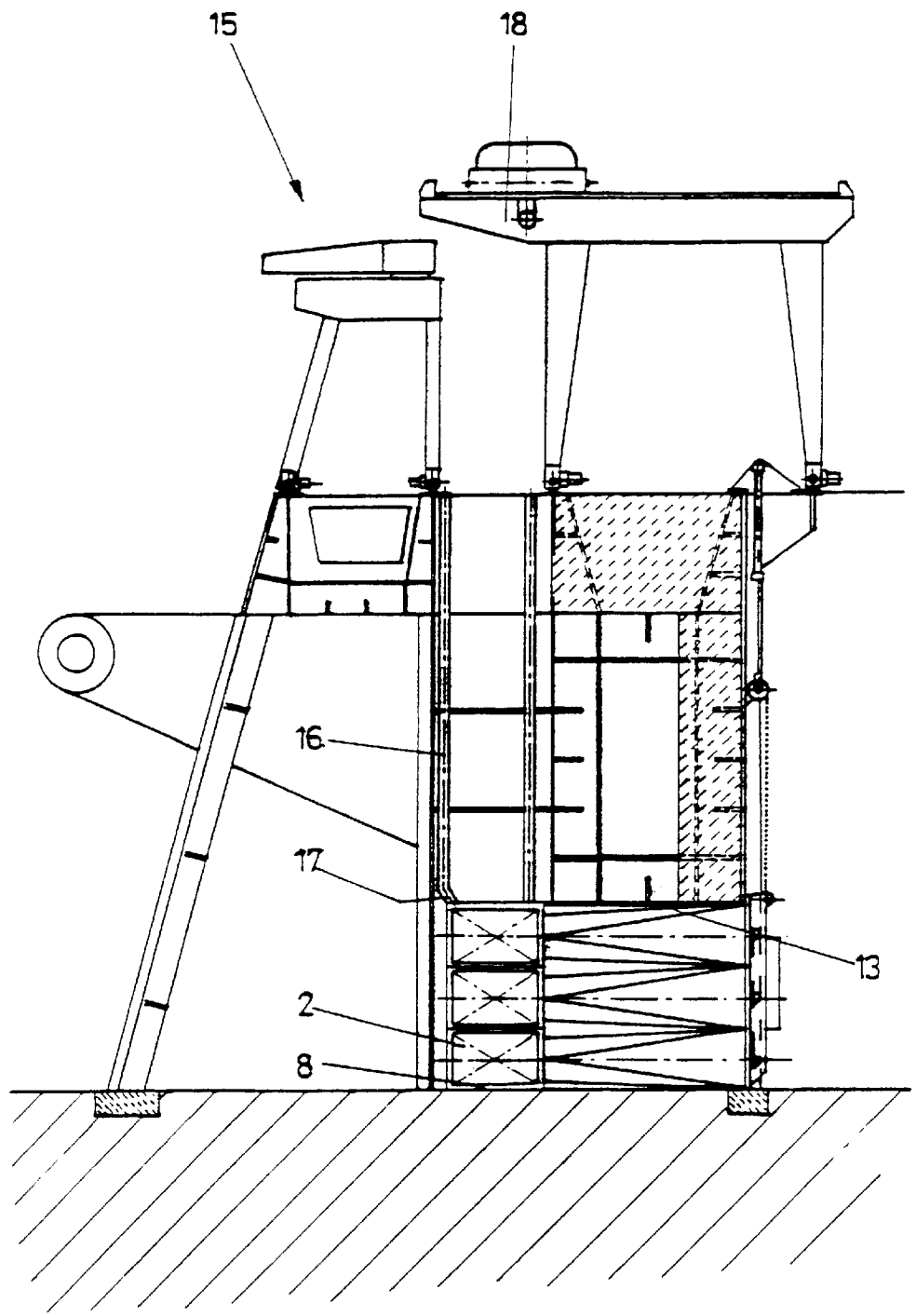
FIG. 7 schematically illustrates an installation for lifting a plurality of bulb turbines according to the invention, for instance, for maintenance purposes.

In the assembled state, coupling with a complementary connection piece provided on the draft tubes is feasible via the semi-shell-shaped connection piece 12 of the supporting element 11, thereby enabling the turbine 2 to be coupled with the draft tube 13 without requiring cumbersome welding and screwing operations on site. For separating the turbine 2 from the draft tube 13 it will do to displace the turbine 2 together with the supporting element 11 or the entire frame 8 by the length of the semi-shell-shaped connection piece 12 in the direction of arrow 14 in FIG. 6 and to subsequently lift the assembly of turbine 2 and support 11 or frame 8 from the operating position in the direction towards the water surface so as to be able to carry out the necessary repair work on site, as is schematically indicated in FIG. 7. Due to the bulb turbine system being arrangeable in a matrix-like array, this configuration renders feasible the removal from the operating position of a row of bulb turbines each, either in the horizontal or in the vertical direction, for maintenance or repair purposes without having to remove from their operating positions the remaining turbines or all of the draft tubes.

FIG. 7 schematically illustrates a plant generally denoted by 15, by which it is feasible to lift a plurality of bulb turbines again schematically indicated by 2 and mounted in a likewise schematically indicated support 8 in order to carry out maintenance or repair work above the water surface. In doing so, the frame or support 8 is lifted and moved along a guide track 16 together with the bulb turbines 2, said guide track being camfered or angled in the region immediately above the upper edge of the support, as indicated by 17. In a structure as exemplified in FIGS. 5 and 6, the special configuration of the guide track 16 enables a plurality of bulb turbines 2 to be each moved relative to the schematically indicated draft tubes 13, which remain stationary, and, after this, to be lifted to the surface using appropriate lifting means known per se. Such lifting means may, for instance, be constituted by a schematically indicated crane 18 or the like. As already pointed out above, bulb turbines 2 arranged, for instance, in a row one above the other can be lifted together for maintenance purposes or the like, while the draft tubes 13, which usually are of larger lengths, remain in their operating positions such that, on the whole, only a part of the overall system having smaller dimensions and hence a considerably reduced weight need be lifted, wherefor accordingly simpler and smaller dimensioned lifting means 18 will do.

Instead of a frame each surrounding a turbine casing and fully formed of frame elements 8, the individual turbine casings may, of course, each be surrounded merely by partial elements of a frame or by single frame elements 8, with an accordingly complete frame structure 3 of relatively low weight and sufficient stability being obtainable by assembling a plurality of turbine units 2.

Furthermore, it may be provided to replace a frame structure allocated to each turbine unit 2 with a common support 3 in the form of a grid- or scaffold-like support structure 3 for a plurality of bulb turbines 2 arranged in a field- or matrix-like array, said support structure comprising respective partial regions for mounting one bulb turbine 2 each.

Simple and small-structured single aggregates, for instance, of an overall length of approximately 2 m at a frame structure of individual square frames of 1 m edge width may be used to form the system 1 with a plurality of bulb turbines 2 being each coupled. It is immediately apparent that a compact overall unit 1 easy to adapt to external conditions will, thus, be obtained. In addition, such small turbine units 2 may be operated in a simple and economically efficient manner both at comparatively low flows or flow rates and at small differences of level, inflow being possible optionally from two directions.

What is claimed is:

1. A system of bulb turbines, wherein the bulb turbines are each comprised of a generator arranged within a substantially cylindrically designed region of a turbine casing and a rotatably mounted turbine runner coupled with the generator, which are each joined by a draft tube, wherein a plurality of bulb turbines are mutually coupled in a field-like or matrix-like array both in a substantially horizontal arrangement one beside the other and in a vertical arrangement one above the other or mounted in at least one common support, respectively, said plurality of bulb turbines each mounted in a common support being detachably coupled with associated draft tubes, wherein for the detachable coupling of the bulb turbines with associated draft tubes in the operating position coupling of a support comprising bulb turbines mounted therein with draft tubes optionally all mounted in one retention means is effected by complementary semi-shell-shaped connection pieces.

2. A system of bulb turbines according to claim 1, wherein a support comprising a plurality of bulb turbines is movable relative to the draft tubes on a, particularly stepped or obliquely extending, guide track.

3. A system of bulb turbines according to claim 1, wherein each bulb turbine is surrounded by, and connected or connectable with, frame elements each defining, at least in the state of the system coupled with neighboring bulb turbines, a frame having a, for instance, substantially square cross section and wherein the frames or frame elements of neighboring bulb turbines are connected, in particular screwed, with one another.

4. A system of bulb turbines according to claim 1, wherein, in a manner known per se, the bulb turbines in the region of the turbine runner and/or in their substantially cylindrical region of the turbine casing are supported on the pertaining frames or frame elements or directly upon one another, respectively.

5. A system of bulb turbines according to claim 1, wherein the support of the turbine casing on the respective frames or frame elements is effected via props or struts each bearing against the corner points of the frames or frame elements having substantially square cross sections.

6. A system of bulb turbines according to claim 1, wherein a common support for the plurality of bulb turbines is formed of a grid-like or scaffold-like structure comprising partial regions each having a substantially square cross section, for mounting one bulb turbine each.

7. A system of bulb turbines according to claim 1, wherein the support carrying a plurality of bulb turbines is capable of being detachably fastened or anchored to the subsoil via fastening or anchoring means.

8. A system of bulb turbines according to claim 1, wherein the inflow of water into the bulb turbines is feasible both in a direction directly onto the turbine runner via the draft tube and in a direction via the turbine casing and subsequently onto the turbine runner.

9. The use of a system of bulb turbines according to claim 1 in a channel system, a sluice system, a sprinkler or an irrigation plant or the like.

* * * * *